Nov. 4, 1924.
A. O. MURDOCK
1,514,255
RESERVE OIL TANK FOR AUTOMOBILES
Filed Dec. 4, 1922
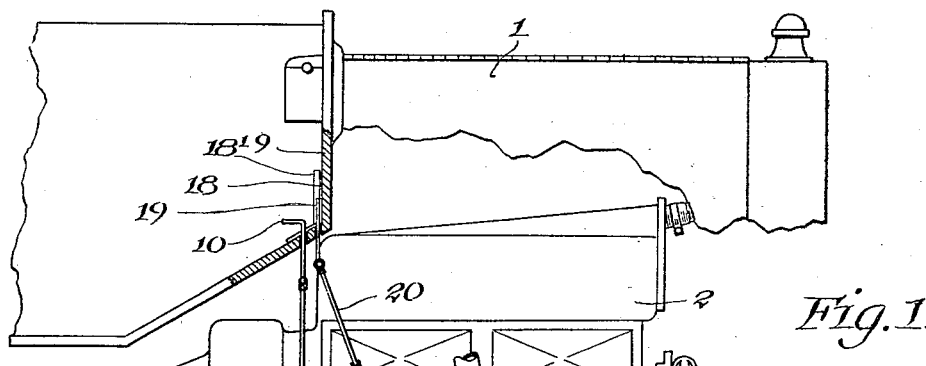
Fig. 1.
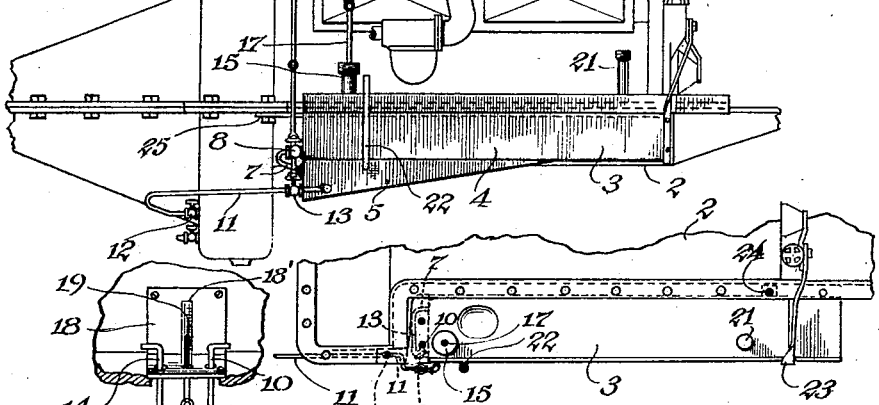
Fig. 2.
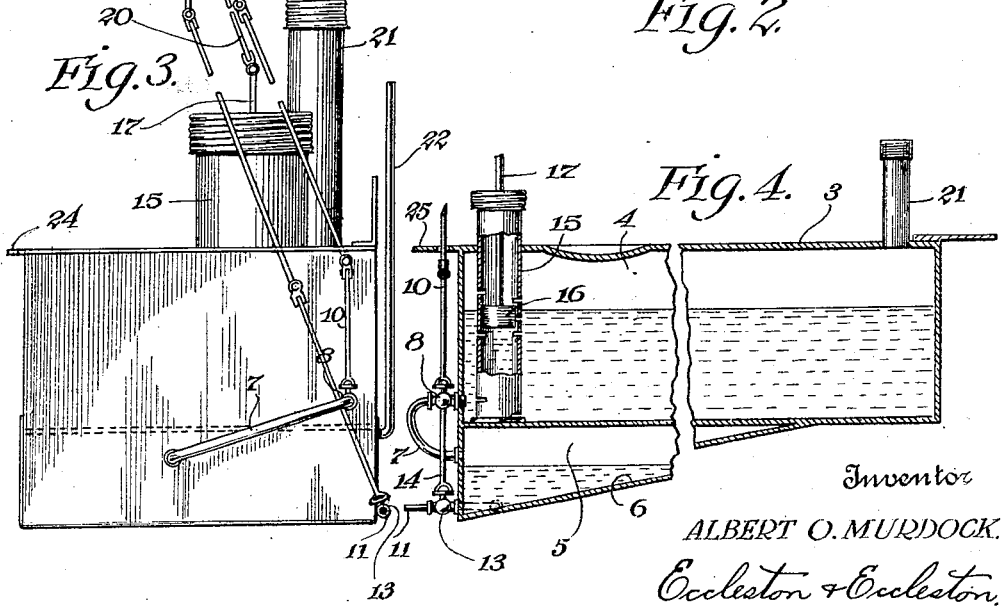
Fig. 3.
Fig. 4.
Inventor
ALBERT O. MURDOCK.
Eccleston & Eccleston
Attorneys Patented Nov. 4, 1924.

1,514,255

UNITED STATES PATENT OFFICE.

ALBERT O. MURDOCK, OF FORT PAYNE, ALABAMA.

RESERVE-OIL TANK FOR AUTOMOBILES.

Application filed December 4, 1922. Serial No. 604,796.

*To all whom it may concern:*

Be it known that I, ALBERT O. MURDOCK, a citizen of the United States, residing at Fort Payne, in the county of De Kalb and State of Alabama, have invented certain new and useful Improvements in Reserve-Oil Tanks for Automobiles, of which the following is a full, clear, and exact description.

My invention relates to a reserve oil tank for automobiles, and has for its object to provide such a device in the form of a compartment tank of such dimensions that the same may be attached to the side of the engine in a position where it will be practically concealed and will in no way interfere with the usual operations and repairs around the engine.

Another object of the invention is the provision of a tank having relatively large and small compartments and means operable from the dash of the automobile whereby the smaller compartment may be filled from time to time from the larger compartment.

A further object of the invention is the provision of means controlled from the dash of the automobile whereby the oil may pass from the smaller compartment of the tank to the crank case, thereby permitting pre-determined quantities of oil to be fed to the engine as desired.

Other objects and advantages of the invention will be apparent from the following description when taken in connection with the accompanying drawings, in which:

Figure 1 is a fragmentary side elevation of an automobile, showing my improved tank in place.

Figure 2 is a plan view of the tank attached to the side of the engine.

Figure 3 is an enlarged end elevation of the tank, a portion of the foot board being indicated with the valve-operating arms in place, and Figure 4 is a fragmentary longitudinal section through the tank.

Referring to the drawing more in detail, the numeral 1 designates an automobile provided with the internal combustion engine 2. In order to supply the crank case of this engine with lubricating oil without leaving the seat, I have devised the compartment tank 3, which includes the relatively large upper compartment 4 and the small lower compartment 5. An inclined wall 6 forms the bottom of the lower compartment 5 for the purpose of allowing the oil to completely drain therefrom.

A conduit 7 leads from the base of the upper compartment 4 to the lower compartment 5, and this conduit is controlled by means of a valve 8 operated from the dash 9 of the automobile by means of the arm 10. A second conduit 11 leads from the lowest point in the lower compartment 5 to the upper test cock 12 of the engine crank case, and this conduit is controlled by means of valve 13 operated from the dash by means of arm 14.

For the purpose of indicating to the driver the amount of oil in the upper compartment I have provided the slotted tube 15 in which is mounted the float 16 which carries the vertically extending rod 17. A plate 18 is mounted on the dash and carries a graduated transparent tube 18' which receives a pointer 19 connected to rod 17 by means of link 20.

The larger compartment 4 may be filled from time to time, as required, by means of the filling nozzle 21, and the smaller or measuring compartment is provided with a vent tube 22 to permit oil to flow into the lower compartment through conduit 7 when the valve is opened.

The tank is supported at the side of the engine by means of a strap 23 attached to the tank and the timer bolt, and also by means of lugs 24 and 25 which are bolted to the engine flange.

In operation, it being assumed that the compartment 4 is filled with lubricating oil, the valve 8 may be opened from the dash by means of the arm 10. Oil will descend from the upper compartment through conduit 7 into the lower compartment until the latter is completely filled. The valve 8 is then closed. When it is desired to place additional oil in the crank case it is only necessary to open valve 13 by means of the arm 14, which will permit the oil to escape from compartment 5 through conduit 11 and test cock 12 into the engine crank case. This operation may be repeated from time to time as desired until both compartments are empty.

It will be understood, of course, that the measuring compartment 5 will be made of a size sufficient to hold 1, 2 or more quarts of oil, as may be deemed suitable. Further-more, the peculiar shape of the measuring compartment permits a rapid and complete discharge of the oil to the crank case.

From the foregoing description it will be seen that I have devised a reserve oil tank of simple construction which may be controlled from the dash of the automobile, and one which will measure off a predetermined charge of oil and then feed the same to the crank case. It will also be noted that the reserve oil tank fits snugly between the side of the engine and the car body and in no wise interferes with the ordinary operations necessary to the cleaning, etc., of the engine.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

What I claim as new and desire to secure by Letters Patent is:

A reserve oil tank for automobiles comprising a relatively long and shallow upper compartment and a lower compartment, said lower compartment being formed with an inclined bottom, a valve-controlled conduit leading from the upper to the lower compartment and having its ends inserted in the end walls of said compartments, and a vent tube leading from the lower compartment.

ALBERT O. MURDOCK.